UNITED STATES PATENT OFFICE.

J. BURROWS HYDE, OF NEW YORK, N. Y.

ARTIFICIAL FUEL.

SPECIFICATION forming part of Letters Patent No. 274,779, dated March 27, 1883.

Application filed August 21, 1882. (No specimens.)

*To all whom it may concern:*

Be it known that I, J. BURROWS HYDE, of New York, in the county of New York and State of New York, have invented certain new and useful Improvements in the Method of Making Artificial Fuel from Peat, &c.; and I do hereby declare that the following is a full, clear, and exact description of the invention, which will enable others skilled in the art to which it appertains to make and use the same.

My improvements relate to the class known as "artificial fuel," and has for its object improvement in the quality of fuel and economy in the cost of the same, which fuel is designed to be fed to furnaces by mechanical means, the apparatus embodying such means forming the subject-matter of a separate application, and which may be immediately referred to in the body of this specification.

My improvements consist in a novel method of preparing peaty matters for process of heating and treating minerals, metals, glass, and also for use in chemical-manufactures, steam-generators, and other apparatus and purposes in the arts; and it further consists in mixing the prepared peat at a moment of combustion with carbureted air in suitable proportions and feeding the same into the furnace.

Heretofore most fuels used for manufacturing iron, steel, and other metals have been more or less largely charged with sulphurous and other impurities, mineral fumes, dust, ash, and other matters injurious to those classes of manufactures, particularly as regards glass, the latter requiring a pure, clear, constant, intense, and exalted heat, largely above that of which the common fuel is capable of inducing. Therefore to supply a fuel that is entirely free from the foregoing objections, and a fuel that will enhance the value of the glass and metals produced by its use as a fuel, are further objects of my invention.

Peat varies greatly in quality, owing to the state of decomposition and the proportion of incorporated earthy matter. I prefer peat that is free from leaves or fiber, and which shows a smooth surface when cut, and when burned will yield the least proportion of ashes. Free-burning peat may vary from two to thirty per cent. of ashy residue, arising from the admixture of earthy matters that impoverish the heating value of the fuel. The calorific power of good peat is, pound for pound, equal to that of mineral coal. A ton of such peat will yield, on distillation, ten thousand to fifteen thousand cubic feet of candle-gas, and five hundred to seven hundred pounds superior quality charcoal. It therefore possesses great heating power. The ash is fine, and so very light that the slightest draft in the flues will sweep them into the chimney, leaving the heating-surfaces free from deposit of non-conducting substances. Iron ore treated with this powdered peat produces a superior quality of charcoal-iron.

In the manufacture of glass with this fuel the present expensive furnaces may be done away with, as well as the various means employed for preventing the sulphur and other impurities of common fuel from passing into the ovens. The small quantity of silica contained in the peat is beneficial to the glass, and may enter into its composition. The constant and regular heat required for glass-manufacture may be readily kept up with this fuel, as it is supplied by mechanical means from an apparatus that prevents gushes of cold air from entering the furnace at intervals, which intermittently chills the interior of the furnace, as will be more fully described in an application filed herewith. The peat should be dug wet from the bed and spread on the ground a few inches deep, or better if upon raised platforms; or may be made into blocks resembling bricks and put in piles or ricks to dry. When well dried it should be ground fine in any proper mill suitable for the purpose; but as such peat dried directly from the bed is usually light, spongy, and friable it will be increased in specific gravity and greatly improved in quality as a fuel if it be passed wet from the bed through a mill or masticator, from which it should flow in a smooth homogeneous mass, and then be spread, dried, and ground into fine powder, as described. This peat product from the drying-bed will be hard and compact as mineral coal, and when ground its particles will not pack in the mill, and yet be found dense and substantial. This prepared peat having been ground to a fine powder, it cannot be utilized unless blown into the furnace or combustion-chamber in a diffused cloud-like condition of uniform density by a current of hot or cold air, steam or other projecting medium, working directly in connection with the pulverizer through a proper conductor from the mill to the furnace, but generally a special apparatus therefor, particularly when used for glass or metallurgical purposes, in connection with a blast of air previously heated, is preferred.

I am aware that mineral-coal dust and certain other fuel substances in fine powder have been used for heating by blowing it into furnaces, and that peat has been used for heating purposes in lump; but I am not aware that peat has ever been so used, and particularly has ever been dug from a bed, then dried, then masticated, and then ground to fine powder to be used for fuel in connection with a blast; and I am also aware that coal-dust has been blown into furnaces with carbureted or hydrogenated gases, and such I do not claim.

Peat has advantages over other pulverized fuel, for reasons before mentioned; also in its cheapness, particularly in districts remote from coal deposits, being generally common throughout the manufacturing districts of our country.

Any approved means may be employed for feeding the peat fuel to the furnace; but I prefer the means before referred to. It is therefore manifest that such combination of method, apparatus, and manipulation as hereinbefore described is capable of application to various heating purposes in manufactures— such as making iron, manufacturing steel, copper, melting glass, annealing-furnaces which require a soft regular heat, &c.—so that by said herein-described improved method of generating and applying heat a better combustion, free from the impurities which affect metals and glass by coal, may be used, and which, by the intensity to which it may be raised and its peculiar quality, admits of application by direct contact and fusion with ores or glass, or by induction through transmitting-surfaces to act on the materials.

The same means for preparing and heating large ingots of metals for rolling or hammering may be applied.

Carbureted air or other enriching compound of hydrocarbon may be mixed or added to the peat-blast when fed to the furnace, as may be desired, or according to the uses to which the fuel may be applied. Therefore this improved solid fuel may be used either separately or combined with the gaseous elements set forth, or varied in proportional quantities and mixtures to effect substantially the same ends or objects herein described.

Having described my invention and the mode of performing the same, what I claim as new, and desire to secure by Letters Patent, is—

1. The process of preparing peat as a fuel suitable for being blown in a state of fine powder into a heating-furnace or combustion-chamber, which consists in masticating or manipulating the peat while yet in a wet condition, drying the same to a solid state to increase its density, and converting such compact material to a fine powder, as described.

2. The method herein described of treating peat fuel while in a wet state, consisting of grinding or masticating it, then drying it, then grinding it again to a fine powder, then mixing it with a jet of carbureted air while being forced into the furnace or combustion-chamber, as described.

3. The process of making artificial fuel of peat as a base, consisting of treating the peat while wet by grinding or pulping it, then drying it, then grinding it, and finally mixing it with aeriform hydrocarbons, and then injecting them, in connection with highly-superheated steam or heated air, or both united for more exalted heat, into furnaces, substantially as described.

4. The process herein described of forming an improved fuel, which consists in preparing peat as a fuel by first grinding it while wet, then drying it, then grinding it into powder, then saturating it with liquid hydrocarbon, and then feeding into a furnace or combustion-chamber by means of a blast, substantially as described.

In testimony that I claim the foregoing as my own I affix my signature in presence of two witnesses.

J. BURROWS HYDE.

Witnesses:
B. F. MORSELL,
O. E. DUFFY.